United States Patent
Kano

(10) Patent No.: US 9,201,496 B2
(45) Date of Patent: Dec. 1, 2015

(54) IMAGE FORMING APPARATUS AND RECORDING MEDIUM

(71) Applicant: Takahiro Kano, Toyonaka (JP)

(72) Inventor: Takahiro Kano, Toyonaka (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 133 days.

(21) Appl. No.: 13/732,499

(22) Filed: Jan. 2, 2013

(65) Prior Publication Data
US 2013/0179808 A1 Jul. 11, 2013

(30) Foreign Application Priority Data
Jan. 6, 2012 (JP) .................... 2012-000954

(51) Int. Cl.
| | |
|---|---|
| G06F 15/177 | (2006.01) |
| G06F 3/01 | (2006.01) |
| H04N 1/00 | (2006.01) |
| G06F 11/30 | (2006.01) |
| G06F 11/32 | (2006.01) |

(52) U.S. Cl.
CPC .............. *G06F 3/01* (2013.01); *G06F 11/3055* (2013.01); *G06F 11/328* (2013.01); *H04N 1/00244* (2013.01); *H04N 1/00464* (2013.01); *G06F 2201/865* (2013.01); *H04N 2201/0072* (2013.01); *H04N 2201/0094* (2013.01)

(58) Field of Classification Search
CPC ........................ G06F 3/1259; H04N 1/00204
USPC .................. 715/760, 716; 358/1.15; 709/223
See application file for complete search history.

(56) References Cited

U.S. PATENT DOCUMENTS

| | | | |
|---|---|---|---|
| 2004/0263898 A1* | 12/2004 | Ferlitsch | ...................... 358/1.15 |
| 2010/0039664 A1 | 2/2010 | Funakawa | |
| 2010/0131595 A1 | 5/2010 | Sugasaki | |
| 2011/0235103 A1 | 9/2011 | Ito | |

FOREIGN PATENT DOCUMENTS

| | | |
|---|---|---|
| JP | 2002-278663 A | 9/2002 |
| JP | 2008-287531 A | 11/2008 |
| JP | 2010-045614 A | 2/2010 |
| JP | 2010-128802 A | 6/2010 |
| JP | 2010-179473 A | 8/2010 |
| JP | 2011-119939 A | 6/2011 |
| JP | 2011-131382 A | 7/2011 |

OTHER PUBLICATIONS

Office Action (Examiner's Decision to Grant a Patent) issued on Jan. 21, 2014, by the Japan Patent Office in corresponding Japanese Patent Application No. 2012-000954, and an English Translation of the Office Action. (6 pages).

* cited by examiner

*Primary Examiner* — Haoshian Shih
(74) *Attorney, Agent, or Firm* — Buchanan Ingersoll & Rooney PC

(57) ABSTRACT

An image forming apparatus includes a display control unit that displays a user interface screen based on web page data that is received from a web server, using a web browser that communicates with the web server within the image forming apparatus, a task monitoring unit that operates independently of the web server, monitors a state of a task on the web server, and acquires status information on the task, a determination unit that determines whether or not the web server is accessible, based on the status information, and a notification unit that, in response to the determination that the web server is inaccessible, notifies an operating user of the fact that the web server is inaccessible by changing a display content of the user interface screen.

10 Claims, 9 Drawing Sheets

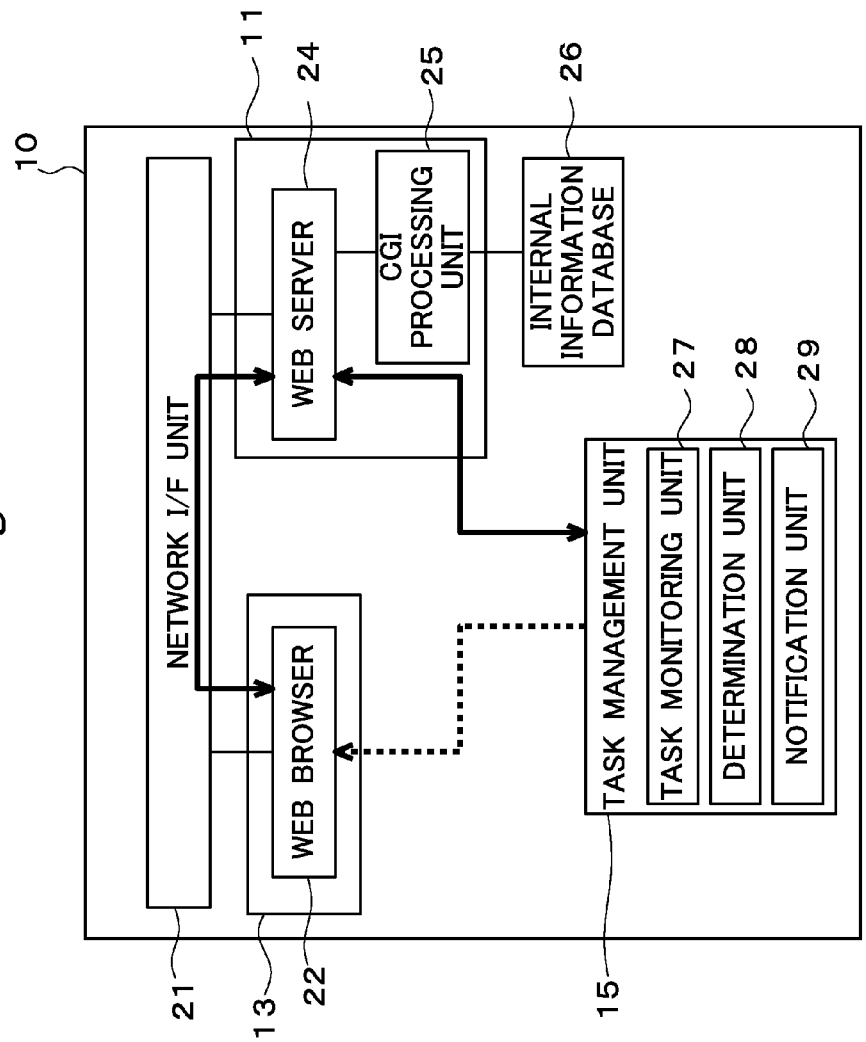

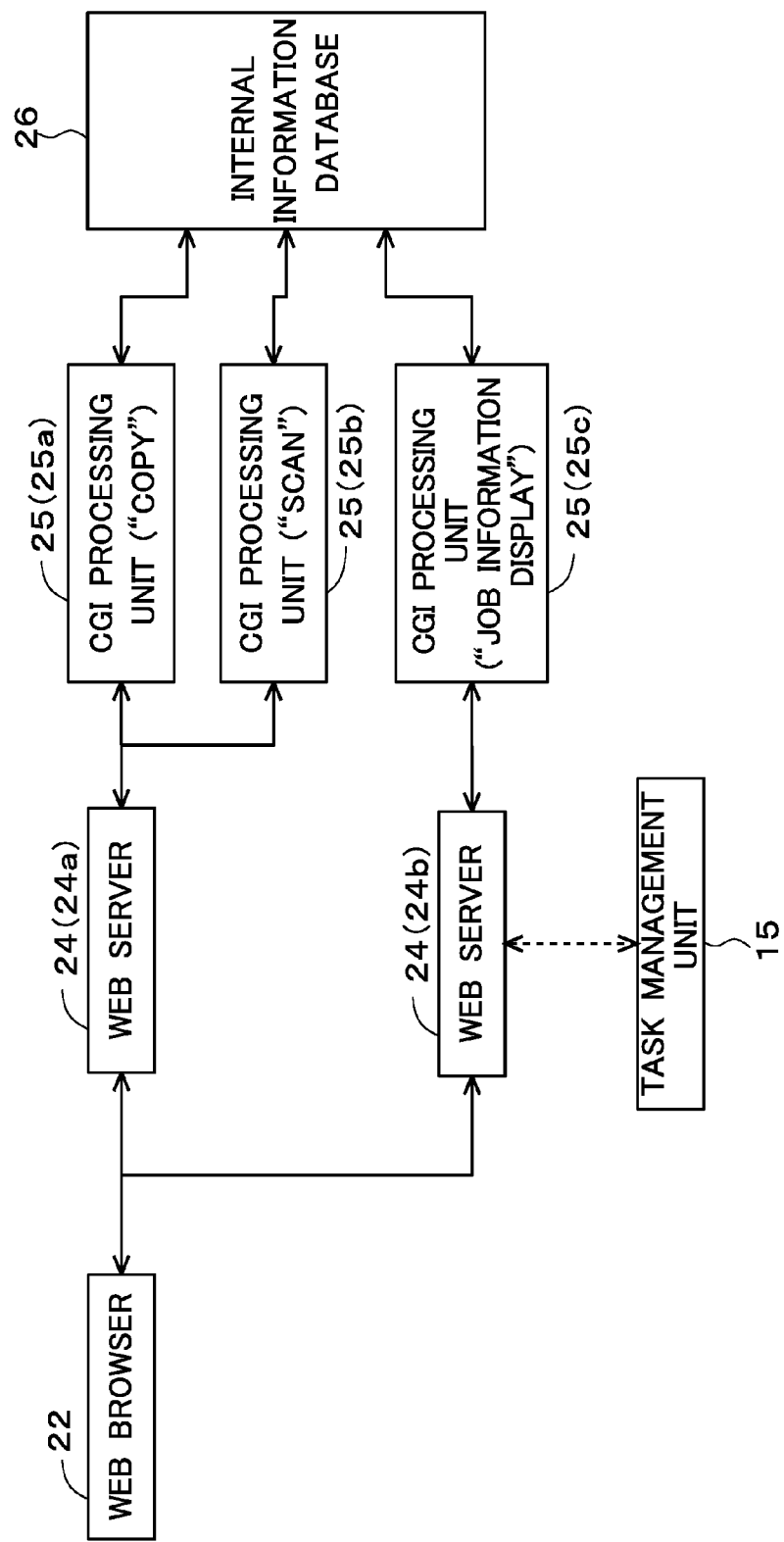

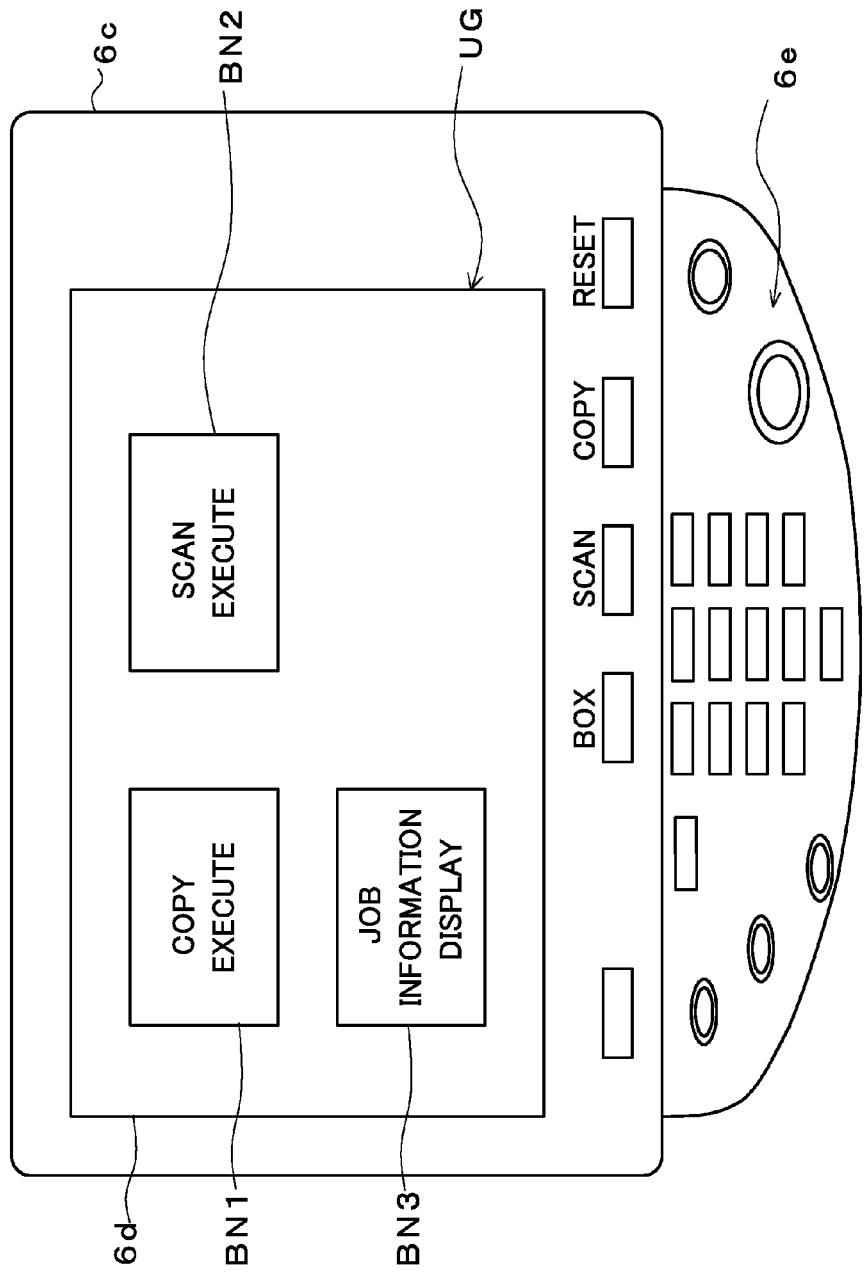

Fig.5

```
<html>
  ...
  <input type ="button" value ="COPY EXECUTE"> onclick =       ← PT1
    "javascript:location.href ='localhost:80/app1/copy.cgi';">
  <input type ="button" value ="SCAN EXECUTE"> onclick =       ← PT2
    "javascript:location.href ='localhost:80/app2/scan.cgi';">
  <input type ="button" value ="JOB INFORMATION DISPLAY"> onclick =   ← PT3
    "javascript:location.href ='localhost:90/app3/joblist.cgi';">
  ...
</html>
```

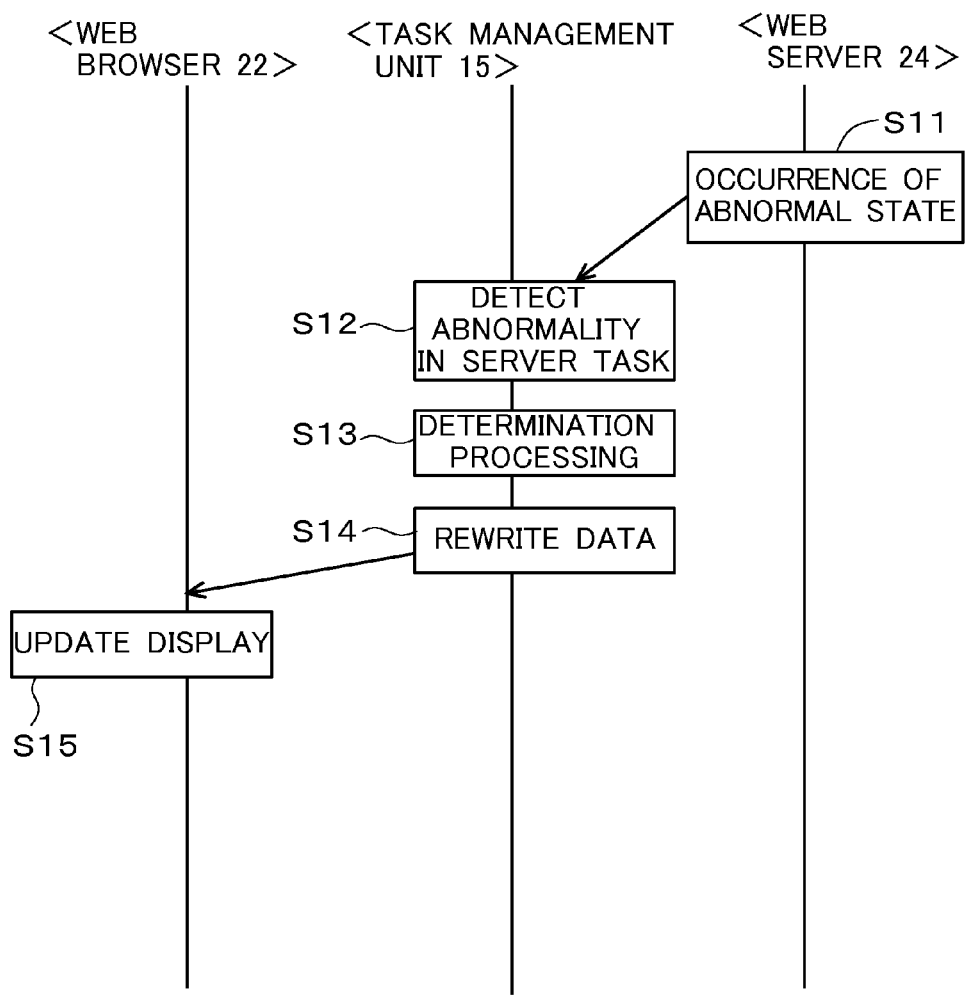

Fig.7

```
<html>
...
<input type ="button" value ="COPY EXECUTE"> onclick =
    "javascript:location.href ="localhost:80/app1//copy.cgi';"'>     ← PT1

<input type ="button" value ="SCAN EXECUTE"> onclick =
    "javascript:location.href ="localhost:80/app2/scan.cgi';"'>     ← PT2

<input type ="button" value ="JOB INFORMATION DISPLAY"> onclick =
    "javascript:location.href ="localhost:90/app3/joblist.cgi';"
    disabled >                                                       ← PT3
...
</html>
```

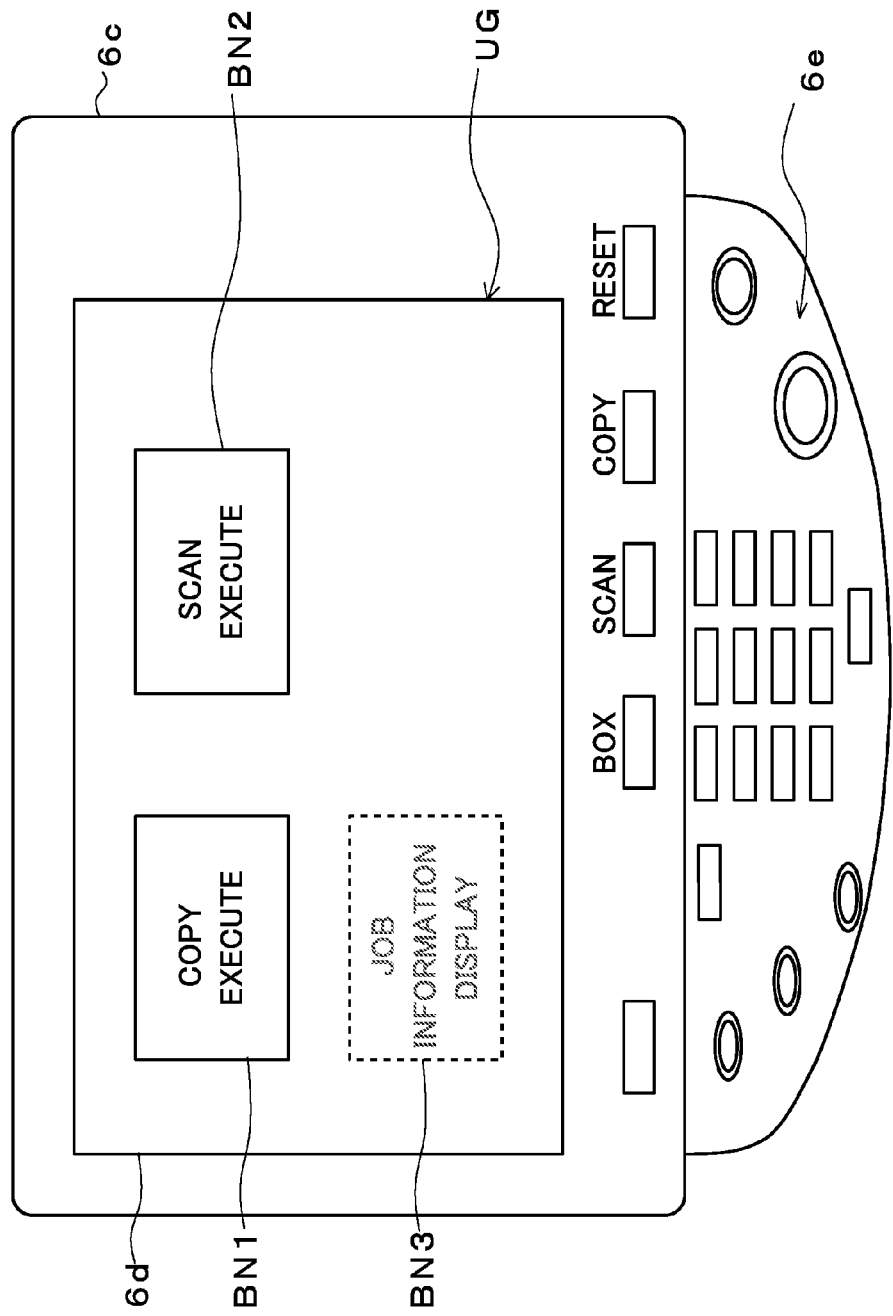

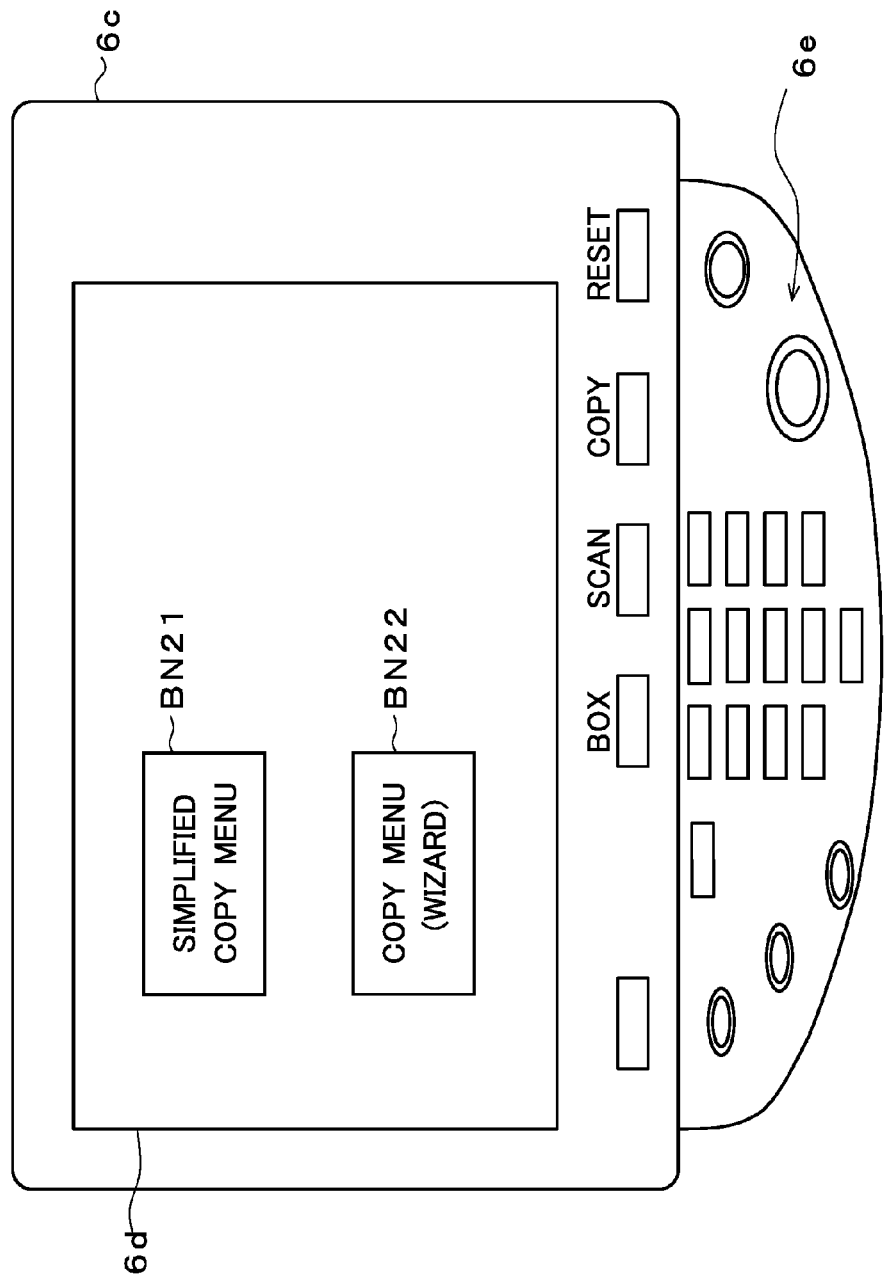

IMAGE FORMING APPARATUS AND RECORDING MEDIUM

This application is based on Japanese Patent Application No. 2012-000954 filed on Jan. 6, 2012, the contents of which are hereby incorporated by reference.

BACKGROUND OF THE INVENTION

1. Technical Field

The present invention relates to an image forming apparatus and a technique associated therewith, and in particular to a technique for displaying a user interface screen in an image forming apparatus.

2. Related Art

In image forming apparatuses such as MFPs, operations are performed using various types of user interface screens.

Techniques for generating such user interface screens using a web browser have been proposed (see Japanese Patent Application Laid-Open Nos. 2010-128802 and 2008-287531, for example). Specifically, a web browser and a web server are both constructed within the same image forming apparatus. The web browser communicates with the web server using a predetermined protocol (HTTP), receives data for user interface screen display (web page data) therefrom, and displays a user interface screen.

In the communication between the web browser and the web server, in response to a request (HTTP request or the like) from the web browser to the web server, the web server transmits data as a reply to the web browser. If there is no request from the web browser side, updating display on the web browser is difficult, and therefore, it is difficult to update display on the web browser in real time based on the information managed by the web server.

In the case where a problem arises with the web server (the web server is in a "BUSY" or "DOWN" state, for example), the web server cannot respond to a request from the web browser. If, in this case, the display screen on the web browser side remains unchanged without being updated, an operating user has no way to recognize the abnormal state of the web server.

In such a situation, even if the operating user gives an instruction by operating a button or the like provided on the web browser (display screen), the web server actually cannot execute processing based on that instruction. The operating user can recognize a problem with the web server only after finding out that no response has been received for a while from the web server (duration of unresponsiveness). Ascertaining the duration of unresponsiveness in response to a user instruction, however, has an adverse effect on user operability.

Note that with the aforementioned techniques disclosed in Japanese Patent Application Laid-Open Nos. 2010-128802 and 2008-287531, because a notification of a problem with the web browser is always carried out via the web server, it is difficult to appropriately issue a notification to the web browser in the event of the occurrence of a problem with the web server.

SUMMARY OF THE INVENTION

It is an object of the present invention to provide a technique that enables appropriate reflection of the state of a web server when constructing a user interface screen using a web browser that communicates with the web server.

According to a first aspect of the present invention, the image forming apparatus includes a display control unit that displays a user interface screen on a display unit based on web page data that is received from a web server, using a web browser that communicates with the web server within the image forming apparatus, a task monitoring unit that operates independently of the web server, monitors a state of a task on the web server, and acquires status information on the task, a determination unit that determines whether or not the web server is accessible, based on the status information, and a notification unit that, in response to determination by the determination unit that the web server is inaccessible, notifies an operating user of the fact that the web server is inaccessible by changing a display content of the user interface screen.

According to a second aspect of the present invention, a non-transitory computer-readable recording medium that records a program for causing a computer incorporated in an image forming apparatus to execute the steps of a) displaying a user interface screen on a display unit based on web page data that is received from a web server, using a web browser that communicates with the web server within the image forming apparatus, b) acquiring status information about a task on the web server using a task monitoring module that operates independently of the web server, c) determining whether or not the web server is accessible based on the status information, and d) in response to determination that the web server is inaccessible, notifying an operating user that the web server is inaccessible by changing a display content of the user interface screen.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows processing units implemented by a controller.

FIG. 3 is a detailed configuration diagram of the processing units in the controller.

FIG. 4 shows an operation panel of the image forming apparatus.

FIG. 5 shows web page data constituting a user interface screen.

FIG. 6 illustrates operations performed by the image forming apparatus.

FIG. 7 shows web page data that has been changed.

FIG. 8 shows an operation panel of the image forming apparatus when a problem arises.

FIG. 9 shows a user interface screen according to a variation.

DETAILED DESCRIPTION OF THE PREFERRED EMBODIMENTS

Figure 1:
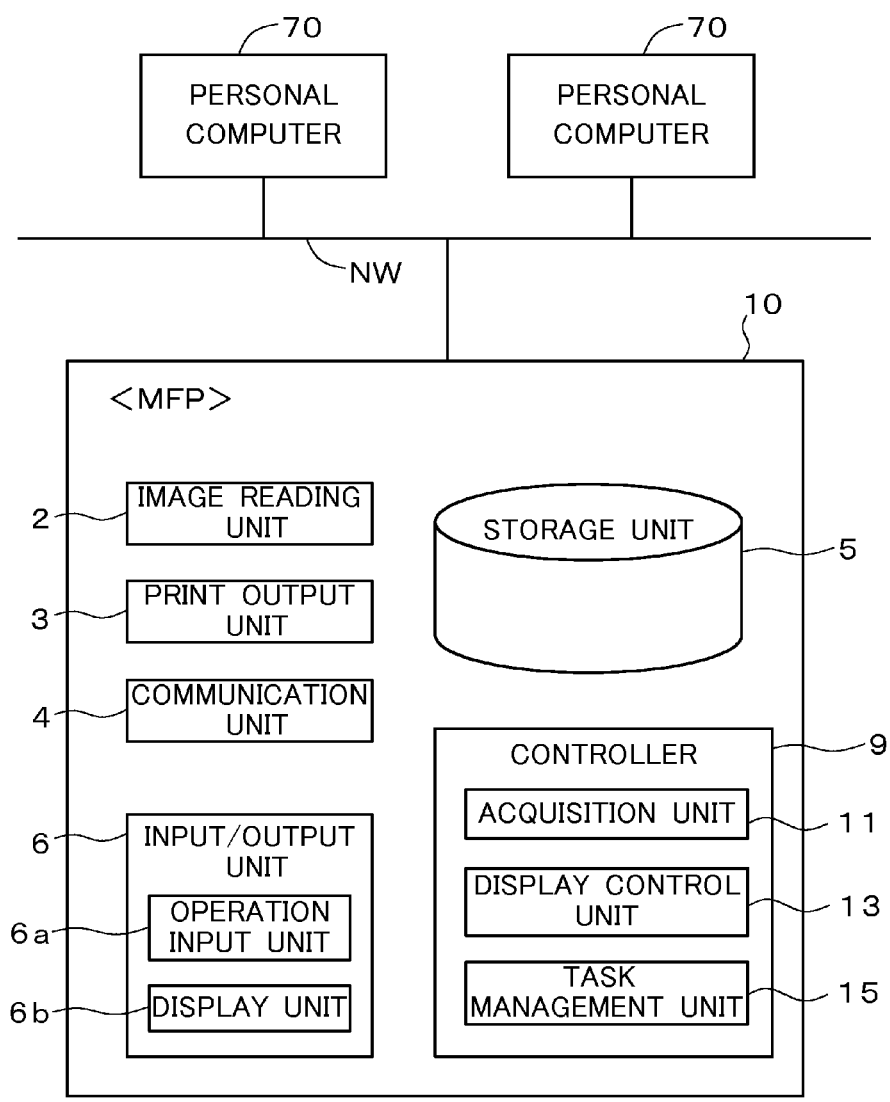
FIG. 1 shows a schematic configuration of an image forming apparatus according to an embodiment.

Hereinafter, embodiments of the present invention will be described with reference to the drawings.

1. Configuration

FIG. 1 shows a schematic configuration of an image forming apparatus 10 according to an embodiment. In the present embodiment, an MFP (Multi-Functional Peripheral) is given as an example of the image forming apparatus 10. FIG. 1 illustrates functional blocks of the MFP 10.

The MFP 10 is an apparatus having various types of functions such as a scan function, a copy function, a facsimile function, and a box storage function (also referred to as a "Multi-Functional Peripheral"). Specifically, as shown in the functional block diagram of FIG. 1, the MFP 10 includes, for example, an image reading unit 2, a print output unit 3, a communication unit 4, a storage unit 5, an input/output unit 6, and a controller 9 and realizes various types of functions by operating these units in combination.

The image reading unit 2 is a processing unit that optically reads (i.e., scans) an original document placed at a predetermined position on the MFP 10 and generates image data of the original document (also referred to as an "original image" or a "scanned image"). The image reading unit 2 is also called a scan unit.

The print output unit 3 is an output unit that prints out an image on various types of media such as paper based on data regarding an object to be printed.

The communication unit 4 is a processing unit capable of facsimile communication via a public network or the like. The communication unit 4 is also capable of network communication via a network NW. In the network communication, various types of protocols such as TCP/IP (Transmission Control Protocol/Internet Protocol) are used, for example. Using the network communication enables the MFP 10 to exchange various types of data with a desired party (e.g., a client computer 70).

The storage unit 5 is configured by a storage device such as a hard disk drive (HDD). The storage unit 5 stores data regarding a print job.

The input/output unit 6 includes an operation input unit 6a that receives input to the MFP 10, and a display unit 6b that displays and outputs various types of information. The MFP 10 includes an operation panel unit 6c (see FIG. 4) that is provided with a touch screen (also called a "touch panel") 6d and various types of hardware keys (hardware buttons) 6e. The touch screen 6d is configured by embedding piezoelectric sensors or the like in a liquid crystal display panel and functions not only as a part of the display unit 6b and but also as a part of the operation input unit 6a. The hardware keys 6e function as a part of the operation input unit 6a.

The controller 9 is a control device that is built in the MFP 10 and performs overall control of the MFP 10. The controller 9 is configured as a computer system that includes, for example, a CPU and various types of semiconductor memories (RAM and ROM). The controller 9 implements various types of processing units by the CPU executing a predetermined software program (hereinafter, also referred to simply as a "program") PG stored in the ROM (e.g., EEPROM). Note that the program PG (specifically, a group of program modules) may be installed in the MFP 10 via portable recording media such as a USB memory (in other words, various types of non-transitory computer-readable recording media), a network NW, or the like. The program PG is an application software program that runs on a predetermined operating system (OS).

Specifically, as shown in FIG. 1, the controller 9 realizes various types of processing units including an acquisition unit 11, a display control unit 13, and a task management unit 15. These processing units are implemented on the operating system (OS) (software implementation). On the operating system (OS), these processing units are configured as, for example, different processes (or different tasks) and are capable of operating independently of each other.

The acquisition unit 11 is a processing unit that acquires information regarding the image forming apparatus 10 (internal information on the image forming apparatus 10 or the like) using a web server 24 (see FIG. 2).

The display control unit 13 is a processing unit that controls display operations using the display unit 6b. The display control unit 13 displays a user interface screen UG (see FIG. 4) regarding the image forming apparatus 10 on the touch screen 6d based on web page data that is received from the web server 24, using a web browser 22 (see FIG. 2) that communicates with the web server 24 within the image forming apparatus 10.

The task management unit 15 is a processing unit that manages the state of a task on the web server 24. The task management unit 15 acquires status information ST on the task and executes processing in accordance with the status information ST.

FIG. 2 is a further detailed diagram of the processing units and the like implemented by the controller 9.

As shown in FIG. 2, the controller 9 of the image forming apparatus 10 is provided with various types of processing units (specifically, a group of program modules or the like) including the web browser 22, the web server 24, a common gateway interface (CGI) processing unit 25, an internal information database 26, a task monitoring unit 27, a determination unit 28, and a notification unit 29.

The web browser 22 is a browsing program module for browsing web pages (pages written in Hypertext Markup Language (HTML) or the like) on the World Wide Web (WWW), for example. Note that the web browser 22 can also execute various types of programs if web pages are written in JavaScript (registered trademark) or the like.

The web server 24 is a program module (web server software) for transmitting data on a specified web page to the web browser in response to a request (hypertext transfer protocol (HTTP) request or the like) from the web browser.

The web server 24 and the web browser 22 are both implemented on the common operating system (OS) in the image forming apparatus 10 (software implementation) and are executed within the image forming apparatus 10. The web browser 22 and the web server 24 communicate with each other via a network interface unit 21 within the image forming apparatus 10. The communication between the web browser 22 and the web server 24 is carried out using a protocol such as HTTP. Note that the network interface unit 21 is a processing unit configured as a part of the communication unit 4 (FIG. 1).

The CGI processing unit 25 is a processing unit that executes a program (CGI program) invoked from the web server 24 in response to a request from the web browser 22 and transmits the content that is based on the processing result of the CGI program as a reply to the web server 24. The processing result of the CGI program obtained by the CGI processing unit 25 is transmitted as a reply from the web server 24 to the web browser 22. The processing result of the CGI program is then, for example, displayed on the web browser 22.

By executing various types of processing in accordance with CGI programs, the content that reflects the processing results of the various types of processing can be displayed on the touch screen 6d. In other words, a variety of processing results of CGI programs are displayed on the web browser 22.

For example, internal information (later-described job information or the like) on the image forming apparatus 10 can be displayed on the web browser 22 by executing a program for acquiring the internal information on the image forming apparatus 10 as a CGI program. Also, a screen for changing the settings (various settings for copying or the like) of the image forming apparatus 10 or the like can be displayed on the web browser 22 by executing a program for setting (changing) the settings of the image forming apparatus 10 as a CGI program.

The internal information database 26 is a database in which various types of internal information on the image forming apparatus 10 are stored. The internal information stored in the internal information database 26 is acquired by the CGI processing unit 25 using a CGI program and transmitted to the web browser 22 via the web server 24.

The task monitoring unit 27 is a processing unit that monitors the state of the web server 24 (specifically, the state(s) of one or a plurality of tasks constituting the web server 24). To be specific, the task monitoring unit 27 executes a software module (monitoring module) for monitoring the state of each task on the web server 24 on the common operating system (OS) with the web server 24. The task monitoring unit 27 then acquires status information ST about each task on the web server 24 via the operating system (OS) using the monitoring module. The software module (monitoring module) for executing the monitoring processing may be configured using various types of application program interfaces (API).

Note that the web server 24 generates and executes a task in response to each request from a web browser inside or outside the image forming apparatus 10. Specifically, in response to a request from the web browser 22 (also called an "internal web browser") that is executed within the image forming apparatus 10, the web server 24 generates and executes a task for the web browser 22. Also, in response to a request from a web browser (also called an "external web browser") that is executed by a device outside the image forming apparatus 10 (e.g., client computer 70), the web server 24 generates and executes a task for the external web browser.

The determination unit 28 determines whether or not the web server 24 is accessible from the web browser 22, based on the status information ST.

In response to determination by the determination unit 28 that the web server 24 is inaccessible, the notification unit 29 notifies an operating user of that fact (i.e., the web server 24 is inaccessible) by changing the display content of the user interface screen UG (rewriting the content of description).

Note that the web browser 22, the task monitoring unit 27, the determination unit 28, the notification unit 29, and the like each operate independently of the web server 24 and are thus capable of operating even if a problem arises with the web server 24.

In FIG. 2, a simplified configuration of the web server 24 and the like is illustrated. Specifically, FIG. 2 illustrates a configuration in which a single web server 24 is provided in the image forming apparatus 10. The present embodiment, however, describes a configuration in which a plurality of (two) web servers 24 are provided in the image forming apparatus 10. FIG. 3 is a detailed configuration diagram of such a configuration.

As shown in FIG. 3, the image forming apparatus 10 is provided with two web servers 24a and 24b. The web server 24a executes CGI programs in cooperation with CGI processing units 25a and 25b. Similarly, the web server 24b executes CGI programs in cooperation with a CGI processing unit 25c. Each CGI program executes processing such as processing for configuring the settings of the image forming apparatus 10, processing for displaying information on the image forming apparatus 10, and the like in cooperation with the internal information database 26.

In the present embodiment, a user interface screen UG as shown in FIG. 4 is realized by the web browser 22 performing HTTP communication or the like with the web server 24. The web browser 22 issues a request to transmit web page data (HTML file or the like) stored in a specific URL to a web server 24 (e.g., web server 24a) and visualizes and displays the content of the web page data that has been transmitted as a reply from the web server 24 (see FIG. 5) after performing rendering processing thereon. Note that FIG. 4 shows the operation panel unit 6c of the image forming apparatus 10, and FIG. 5 shows a part of the web page data (HTML file) constituting the user interface screen UG (FIG. 4).

As shown in FIG. 4, the operation panel unit 6c is provided with the touch screen 6d and various types of hardware keys (hardware buttons) 6e.

The touch screen 6d displays various types of user interface screens UG. For example, FIG. 4 illustrates by way of example a user interface screen UG that contains a "copy execute" button BN1, a "scan execute" button BN2, and a "job information display" button BN3.

As described above, the user interface screen UG as shown in FIG. 4 is displayed based on the web page data (HTML data) as shown in FIG. 5.

When one of the buttons BN1, BN2, and BN3 in the user interface screen UG in FIG. 4 is pressed by an operating user, the corresponding CGI program is executed and the result of the execution of the CGI program is displayed on the touch screen 6d. In other words, the content of the user interface screen is updated and displayed.

Here, the web browser 22 can generally execute a CGI program located at a specified URL in the following format: http://address:port/folder/subfolder/fil.cgi?param=value.

For example, in the case where a port number "80" of the IP address "(address=)localhost" is assigned to the web server 24a, when a URL is specified in the description: http://localhost:80/cgi1/app1/app1.cgi, a CGI program "app1.cgi" that is stored in a subfolder "app1" of a folder "cgi1" under the control of the web server 24a is executed by the web server 24. Similarly, when a URL is specified in the description: http://localhost:80/cgi2/app2/app2.cgi, a CGI program "app2.cgi" that is stored in a subfolder "app2" of a folder "cgi2" under the control of the web server 24a is executed by the web server 24a.

In the case where a port number "90" of the IP address (address=)localhost is assigned to the web server 24b, when a URL is specified in the description: http://localhost:90/cgi3/app3/app3.cgi, a CGI program "app3.cgi" that is stored in a subfolder "app3" of a folder "cgi3" under the control of the web server 24b is executed by the web server 24b.

In this way, the two web servers 24a and 24b to which the same IP address is assigned are distinguished from each other by the port number.

FIG. 5 shows an example (file description example) in which the web page data is written using JavaScript (registered trademark) or the like and a CGI program is invoked in the Java (registered trademark) format, rather than in the above-described general format.

Specifically, in response to the press of each button, a CGI program is executed in accordance with the description of the corresponding part (in particular, the description from "onclick" onward).

For example, when the "copy execute" button BN1 is pressed, the CGI program "copy.cgi" in the folder "app1" is executed by the web server 24a, to which the port number "80" of the IP address (address=)localhost is assigned, in accordance with the description of a portion PT1: <input type="button" value="copy execute"> onclick="javascript:location.href='localhost:80/app1/copy.cgi';">.

Similarly, when the "scan execute" button BN2 is pressed, the CGI program "scan.cgi" in the folder "app2" is executed by the web server 24a, to which the port number "80" of the IP address (address=)localhost is assigned, in accordance with the description of a portion PT2: <input type="button" value="scan execute"> onclick="javascript:location.href='localhost:80/app2/scan.cgi';">.

When the "job information display" button BN3 is pressed, the CGI program "joblist.cgi" in the folder "app3" is executed by the web server 24b, to which the port number "90" of the IP address (address=)localhost is assigned, in accordance with the description of a portion PT3: <input type="button" value="job information display"> onclick="javascript: location.href='localhost:90/app3/joblist.cgi';">.

When each CGI program is executed, the display content of the touch screen 6d is updated in accordance with the execution of the CGI program.

For example, when the CGI program "copy.cgi" is executed in response to the press of the "copy execute" button BN1, various types of processing for executing copying (including processing for displaying a copy setting screen, for example) are executed as needed. Similarly, when the CGI program "scan.cgi" is executed in response to the press of the "scan execute" button BN2, various types of processing for executing scanning (including processing for displaying a scan setting screen, for example) are executed as needed. When the CGI program "joblist.cgi" is executed in response to the press of the "job information display" button BN3, processing for displaying information on various types of jobs (including processing for displaying a screen for selecting the job type, processing for displaying job information corresponding to the selection result (selected job type), for example) is executed as needed.

2. Operation

Next is a description of operations performed by the image forming apparatus 10.

During normal operation of the image forming apparatus 10, in response to a request as described above (request in the Java (registered trademark) format or the like) from the web browser 22, the web server 24 transmits information on the specified URL (CGI program or the like) as a reply to the web browser 22. For example, the web server 24 executes the CGI program "copy.cgi" corresponding to the "copy execute" button BN1 using the CGI processing unit 25a and transmits information regarding the processing result of that CGI program as a reply to the web browser 22.

Incidentally, if there is a problem with the web server 24, the web server 24 cannot respond to a request from the web browser 22. If, in such a case, the web browser keeps displaying the normal screen, the operating user cannot recognize the abnormal state of the web server. The operating user thus executes a normal operation and can recognize an abnormality in the web server only after finding out that no response has been received for a while from the web server 24 (duration of unresponsiveness). Ascertaining the duration of unresponsiveness, however, causes unnecessary waiting time, thus adversely affecting user operability.

In view of this, the present embodiment illustrates by way of example a configuration in which the operating status of the web server 24 is checked in real time and the display content of the user interface screen is changed in real time in accordance with the operating status.

Specifically, the task management unit 15 (task monitoring unit 27 and the like) that monitors the state of the web server 24 (specifically, task(s) thereon) is provided. When the task management unit 15 detects an abnormality (error/busy state or the like) in the web server 24, the task management unit 15 causes the web browser 22 to redraw the screen. More specifically, the task management unit 15 rewrites the web page data (HTML data) that has been acquired by the web browser 22 and temporarily stored, and immediately after the rewriting, issues a redraw instruction (update/display instruction) based on the web page data that has been rewritten. Note that in the present example, original web page data that is stored under the control of the web server 24 is maintained as it is without being rewritten, and only the web page data (so-called copied data) that has been acquired by the web browser 22 and temporarily stored therein is rewritten.

Here, the state (normal/abnormal state) of the web server 24 is always being monitored by the task monitoring unit 27 (see FIG. 2) via the operating system (OS).

The abnormal state (non-normal state) of the web server 24 includes, for example, two states, namely, a busy state and a down state.

The web server 24 enters the down state under the following situation. Specifically, in the case where some sort of problem or the like arises with a task operating in response to a request from the web browser 22 and that task itself is interrupted, the web server 24 (specifically, that task) enters the down state.

Also, the web server 24 enters the busy state under the following situation. Specifically, in the case where a maximum value (maximum number) of tasks that can be executed by the web server 24 is set for the image forming apparatus 10 and the maximum number of tasks has already been executed, the web server 24 enters the busy state. More specifically, the web server 24 enters the busy state in the case where the web server 24 has already executed the maximum number of tasks that can be executed in response to requests from web browsers of external devices (external browsers) of the image forming apparatus 10. In this case, the web server 24 cannot execute a new task in response to a new request from the internal web browser 22.

The web server 24 also enters the busy state in the case where the controller 9 is already executing a higher-priority task other than web server tasks and accordingly CPU resources cannot be allocated to any web server task. Moreover, the web server 24 also enters the busy state in the case where the task that is being executed by the web server 24 is a higher-priority task and the web server 24 cannot accept any other task.

On the other hand, if the web server 24 is in a state other than the abnormal states as described above, it is determined that the web server 24 is in the normal state (non-abnormal state).

FIG. 6 illustrates operations performed by the image forming apparatus 10 (to be specific, operations performed when a problem arises with the web server 24). Hereinafter, these operations will be described with reference to FIG. 6 and the like.

A case is assumed in which a problem arises with a web server 24 (here, only the web server 24b) at a certain time T10 under the situation in which the task monitoring unit 27 conducts monitoring as described above (step S11).

The task monitoring unit 27 repeatedly acquires the status information ST about each task on each web server 24 (specifically, web servers 24a and 24b) via the operating system (OS), irrespective of before and after the occurrence of a problem. The determination unit 28 determines whether or not each web server 24 is accessible based on the acquired status information ST.

If, immediately after the time T10, the task monitoring unit 27 detects based on the acquired status information ST that the web server 24b has transitioned to the abnormal state (e.g., busy state) (step S12), the determination unit 28 determines that the web server 24b is inaccessible (step S13).

Then, this occurrence of the abnormal state is notified to the operating user via the web browser 22 (steps S14 and S15).

Specifically, the notification unit 29 of the task management unit 15 disables processing that includes the specified URL (localhost:90) corresponding to the web server 24 (24b). To be specific, the notification unit 29 disables a display portion corresponding to the URL (localhost:90) of the web server 24b in the web page data (HTML data) WP that has been received by the web browser 22 and temporarily stored in the storage unit 5 under the control of the web browser 22.

More specifically, the notification unit 29 updates (rewrites) the web page data WP by adding a description "disabled" to the portion PT3 of the web page data WP (in the present example, immediately before the last tag) as shown in FIG. 7 (step S14). The description "disabled" indicates that the button BN3 (corresponding INPUT element) is disabled. Note that the software module (notification unit 29) for executing such rewriting processing may be configured using various types of application program interfaces (API).

The notification unit 29 further issues an redraw instruction (update/display instruction) to the web browser 22. In response to the redraw instruction, the web browser 22 updates the display content based on the web page data WP that has been changed (step S15). Through this update processing, only the button BN3 corresponding to the processing involving access to the web server 24b in the abnormal state, out of the three buttons BN1, BN2, and BN3, is grayed out (see FIG. 8). On the other hand, the buttons BN1 and BN2 corresponding to the processing involving access to the web server 24a in the normal state are kept in the normal display state. Note that FIG. 8 illustrates the screen after updating (updated screen). FIG. 8 illustrates a state in which the button BN3 is grayed out with the contour of the button BN3 being indicated by the broken line.

In this way, in response to the determination that the web server 24 (specifically, 24b) is inaccessible, the display content is changed so as to disable a portion corresponding to the web server 24b in the user interface screen UG. Accordingly, the operating user is notified of the fact that the web server 24b is inaccessible. As described above, the notification unit 29 notifies the operating user of the fact that the web server 24b is inaccessible by changing the display content on the web browser 22.

Note that when all the web servers 24 are in the normal state, it is determined that every web server 24 is accessible, and a normal operation is performed.

As described above, according to the present embodiment, the task management unit 15 (task monitoring unit 27) detects the status information on each web server 24, and the determination unit 28 determines accessibility to the web server 24. To be specific, if the web server 24b is determined as being in the abnormal state ("busy state" or "down state"), the determination unit 28 determines that the web server 24b is inaccessible from the web browser 22 (step S13). Then, the operating user is notified of that fact via the web browser 22 (steps S14 and S15). Accordingly, the image forming apparatus 10 is capable of notifying, in real time, the operating user of the state of the web server 24 using the web browser 22. In particular, the image forming apparatus 10 is capable of appropriately reflecting the states of web servers when constructing a user interface screen using the web browser that communicates with the web servers. To be more specific, because the display content of the web browser 22 is changed by the task management unit 15 (without via the web servers 24), the states of the web servers 24 can be appropriately reflected to the user interface by the web browser 22.

3. Variations

While the above has been a description of an embodiment of the present invention, the present invention is not intended to be limited to the content described above.

For example, while the above-described embodiment takes the example of the configuration in which a plurality of web servers are provided in the image forming apparatus 10, the present invention is not limited thereto, and only a single web server may be provided in the image forming apparatus 10.

While the above-described embodiment takes the example of the configuration in which the notification unit 29 issues a redraw instruction (update/display instruction) in step S14 immediately after the web page data WP has been rewritten, the present invention is not limited thereto. For example, a configuration is possible in which a data rewriting detection module is constantly executed so that rewriting of the web page data WP can be detected in real time and redrawing based on the rewritten web page data WP can be performed in response to the rewriting.

While the above-described embodiment assumes the case in which only one of the web servers 24a and 24b is inaccessible, the present invention is not limited thereto. In the case where the web servers 24a and 24b are both inaccessible, the display content may be changed so as to disable portions corresponding to both of the web servers 24a and 24b (three buttons BN1, BN2, and BN3) in the user interface screen UG.

While the above-described embodiment takes the example of the configuration in which the buttons for giving various types of instructions including "copy execute", "scan execute", and "job information display" are formed on the user interface screen UG by the web browser, the present invention is not limited thereto. For example, as shown in FIG. 9, buttons for giving various types of other instructions (a button for executing a "simplified copy menu" and a button for executing a "copy menu wizard") may be formed on the user interface screen UG by the web browser. The button for executing a "simplified copy menu" is an instruction button for displaying only main setting items out of a large number of setting items regarding the copy operation as a menu screen (simplified copy menu screen). The button for executing a "copy menu wizard" is an instruction button for displaying a menu screen in which a plurality of setting items are sequentially set in the form of a wizard.

In the menu screen or the like on which buttons for giving such various types of instructions are displayed, operations similar to those of the above-described embodiment can be executed. Specifically, whether or not a web server corresponding to the CGI program assigned to each button is accessible can be determined based on the status information ST on the web server. In particular, by changing the display content of a user interface screen in response to the result of determination that a web server is inaccessible, the operating user can be notified of that fact (the web server is inaccessible).

While the above-described embodiment takes the example of the configuration in which the internal information on the image forming apparatus 10 is acquired by the web servers 24 and operations based on the internal information are performed by the web servers 24, the present invention is not limited thereto. For example, a configuration is possible in which other information on the image forming apparatus 10 (e.g., a help file regarding operations of the image forming apparatus 10) is acquired by the web servers 24 and operations based on that information (such as the operation of displaying the help file) are performed by the web servers 24.

While the above-described embodiment takes the example of the configuration in which a button corresponding to the web server 24 in the abnormal state is disabled by being grayed out, the present invention is not limited thereto. For example, the button BN3 corresponding to the web server 24b in the abnormal state (see FIG. 4) may be changed into a component that cannot be pressed (i.e., a text display area that simply displays the letters "job information display").

Alternatively, the fact that the web server 24 corresponding to the button BN3 is inaccessible may be indicated by giving an attention attracting mark or the like to the button BN3.

While the above-described embodiment takes the example of the configuration in which the notification of the occurrence of a problem with a web server 24 to the operating user is only carried out via the display/update processing by the web browser 22, the present invention is not limited thereto. For example, various types of notification processing (e.g., notification processing in which an LED indicator for abnormality notification, provided separately from the touch screen 6d in the image forming apparatus 10, is caused to be lit) may be performed in addition to the display/update processing by the web browser 22. Such notification processing may be executed by the task management unit 15 invoking and executing a program module for various types of notification processing.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming apparatus comprising:
a display control unit that displays a user interface screen on a display unit based on web page data that is received from a web server, using a web browser that communicates with the web server within the image forming apparatus;
a task monitoring unit that operates independently of the web server, monitors a state of a task on the web server, and acquires status information on the task;
a determination unit that determines whether or not the web server is accessible, based on the status information; and
a notification unit that, in response to determination by the determination unit that the web server is inaccessible, notifies an operating user of the fact that the web server is inaccessible by changing a display content of the user interface screen.

2. The image forming apparatus according to claim 1, wherein
the notification unit changes the display content of the user interface screen by changing a content of the web page data.

3. The image forming apparatus according to claim 2, wherein
the notification unit changes the content of the web page data and issues a redraw instruction to the web browser, and
in response to the redraw instruction, the display control unit displays an update screen that is based on web page data that has been changed on the display unit, using the web browser.

4. The image forming apparatus according to claim 1, wherein
in response to determination based on the status information by the determination unit that the web server is inaccessible, the notification unit changes the display content so as to disable a portion corresponding to the web server in the user interface screen.

5. The image forming apparatus according to claim 1, wherein
the task monitoring unit executes a monitoring module on a common operating system with the web server, the monitoring module being a software module for monitoring a state of the task on the web server, and acquires the status information via the operating system using the monitoring module.

6. The image forming apparatus according to claim 1, wherein
the web browser is capable of communicating with a plurality of web servers,
the task monitoring unit acquires the status information on each of the plurality of web servers,
the determination unit determines whether or not each of the plurality of web servers is accessible based on the status information on the web server, and
in response to determination by the determination unit that at least one of the plurality of web servers is inaccessible, the notification unit notifies an operating user of the fact that the at least one of the web servers is inaccessible.

7. The image forming apparatus according to claim 6, wherein
in response to determination based on the status information by the determination unit that the at least one of the web servers is inaccessible, the notification unit changes the display content so as to disable a portion corresponding to the at least one of the web servers in the user interface screen.

8. A non-transitory computer-readable recording medium that records a program for causing a computer incorporated in an image forming apparatus to execute the steps of:
a) displaying a user interface screen on a display unit based on web page data that is received from a web server, using a web browser that communicates with the web server within the image forming apparatus;
b) acquiring status information about a task on the web server using a task monitoring module that operates independently of the web server;
c) determining whether or not the web server is accessible based on the status information; and
d) in response to determination that the web server is inaccessible, notifying an operating user that the web server is inaccessible by changing a display content of the user interface screen.

9. The image forming apparatus according to claim 1, wherein the task monitoring unit monitors the state of the task on the web server and acquires the status information on the task irrespective of a communication status between the web browser and the web server.

10. The non-transitory computer-readable recording medium according to claim 8, wherein the task monitoring unit module acquires the status information on the task irrespective of a communication status between the web browser and the web server.

* * * * *